United States Patent [19]
Todd

[11] Patent Number: 4,951,227
[45] Date of Patent: Aug. 21, 1990

[54] DIMENSION ANALYSIS OF DRAWINGS

[75] Inventor: Philip H. Todd, Aloha, Oreg.

[73] Assignee: Tektronix, Inc., Beaverton, Oreg.

[21] Appl. No.: 251,270

[22] Filed: Sep. 30, 1988

[51] Int. Cl.$^5$ .............................................. G06F 15/62
[52] U.S. Cl. ..................................... 364/518; 364/521; 364/522
[58] Field of Search ............... 364/518, 520, 521, 522, 364/523, 560, 562, 518, 520, 522, 523, 560, 562

[56] References Cited
U.S. PATENT DOCUMENTS
4,058,849 11/1977 Fitzgerald et al. .................. 364/520

Primary Examiner—Gary V. Harkcom
Assistant Examiner—Michael A. Jaffe
Attorney, Agent, or Firm—John Smith-Hill

[57] ABSTRACT

Dimensioned sketches are analyzed using graph theoretical concepts to determine whether dimension constraints are sufficient to define unique geometry and are nonredundant.

8 Claims, 8 Drawing Sheets

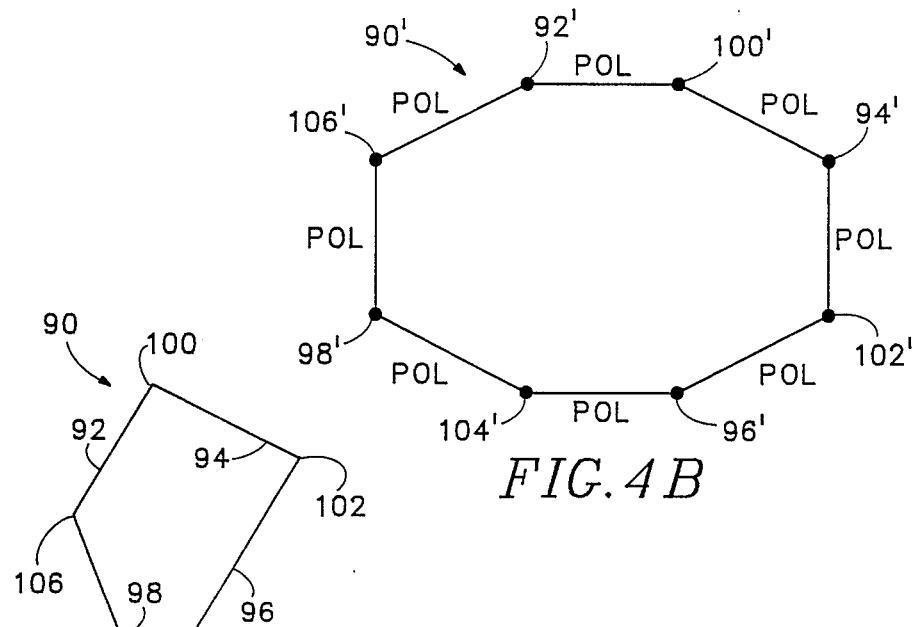
*FIG.4B*
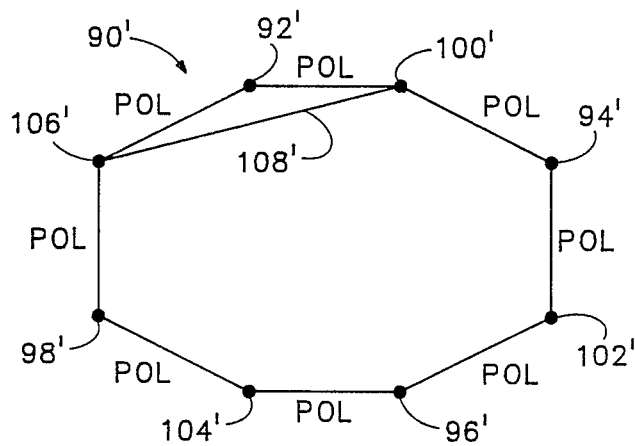
*FIG.4A*
*FIG.5B*
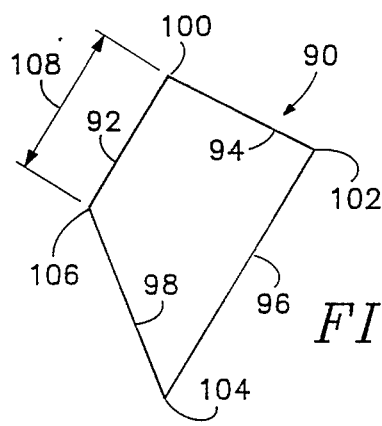
*FIG.5A*

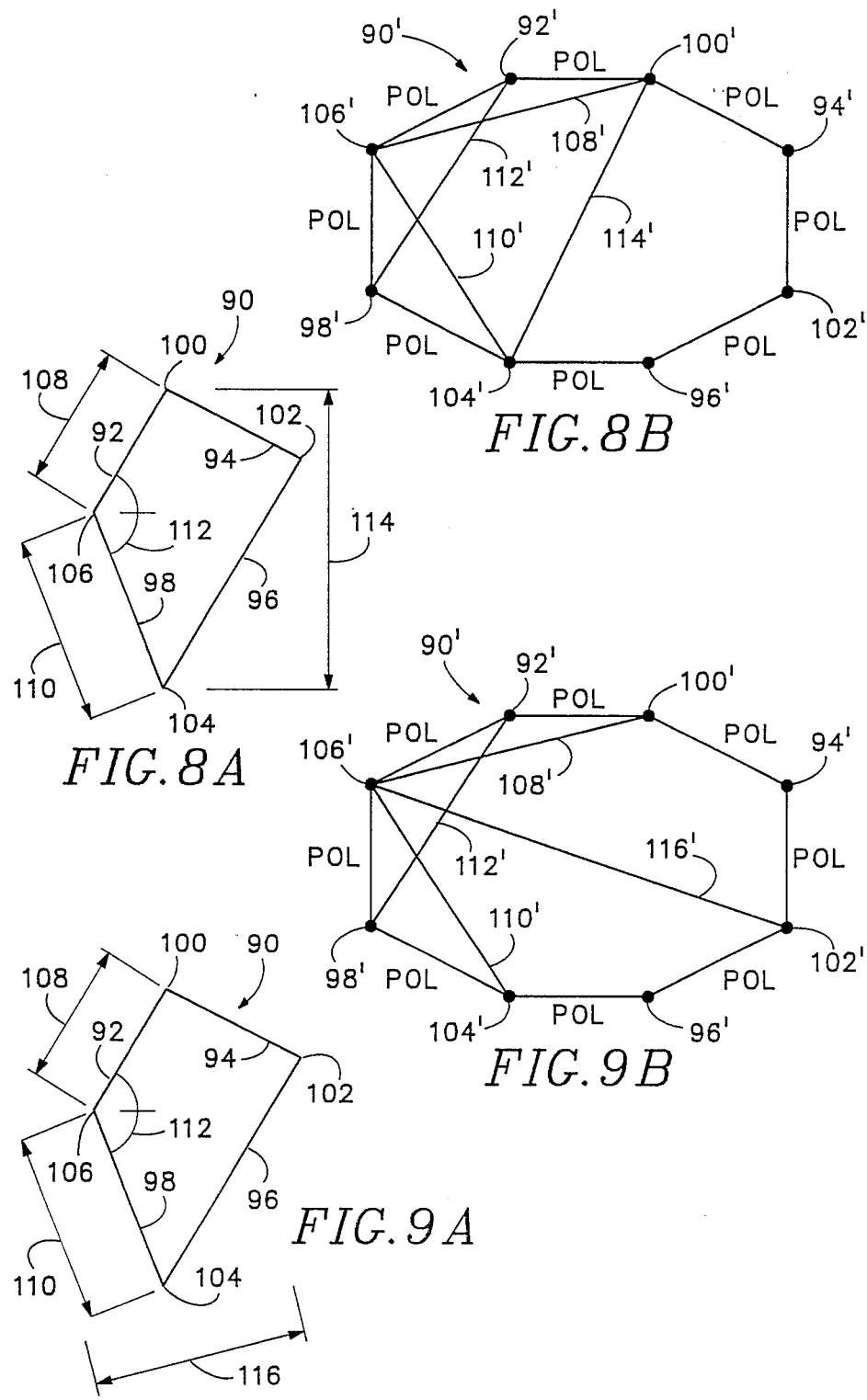

DIMENSION ANALYSIS OF DRAWINGS

BACKGROUND OF THE INVENTION

The present invention relates generally to analysis of dimensioned drawings and particularly to dimension analysis of computer generated drawings.

In a typical Computer Aided Design (CAD) system a user generates a drawing by explicit specification of geometric entities in terms of cartesian coordinates. The user must accurately construct the drawing so as to uniquely define its geometry. In a dimension driven CAD system, the user first establishes the topologic aspects of the drawing and subsequently imposes dimension constraints. A scale drawing is generated by dimension analysis of the topologic structure and dimension constraints imposed thereon. Some dimension driven CAD systems model the drawing as a set of equations and solve the equations on a strictly numerical basis but such systems are time consuming and provide little meaningful error information to the user. According to other dimension driven methods, the user specifies a particular order of construction, i.e. an explicit sequential application of constraints or geometric operations, so as to accomplish a unique geometry in light of an ordered set of dimension constraints. This method requires the user to think in cumbersome geometric terms not directly related to the task of generating a drawing. It is desirable for a dimension driven CAD system to determine efficiently when a set of dimension constraints uniquely and consistently defines the drawing geometry.

SUMMARY OF THE INVENTION

A preferred embodiment of the present invention in a first aspect is a method of dimension analysis wherein a topologic and dimension definition are specified and geometric entities associated with a given number of constraints are removed from the topologic and dimension definition to test for dimension errors. According to this method a maximum set of independent dimension constraints are established while insuring a unique geometric description of the drawing and freeing the user of the responsibility of setting forth a particular order of construction.

A preferred embodiment of the present invention in a second aspect is a method of dimension analysis utilizing graph theoretical concepts whereby a constraint graph is constructed, with vertices corresponding to geometric entities and edges corresponding to structure and dimension constraints, and subsequently reduced by successively removing vertices of a given degree and the connecting edges to verify drawing geometry and provide a sequence of geometric operations for generating a scaled drawing.

A preferred embodiment of the present invention in a third aspect is a method of converting a dimensionally constrained topologic sketch into a scale drawing.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIGS. 4-10 illustrate interactive dimension analysis of a drawing to detect overdimensioning, consistent dimensioning, and maximally consistent dimensioning;

DETAILED DESCRIPTION

Figure 1A:
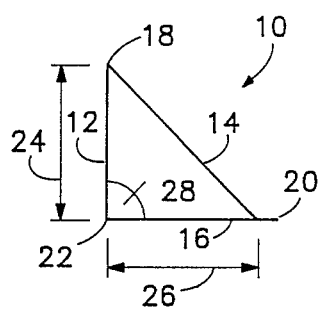
FIG. 1 illustrates a maximally consistent drawing and its corresponding constraint graph.
Figure 1B:
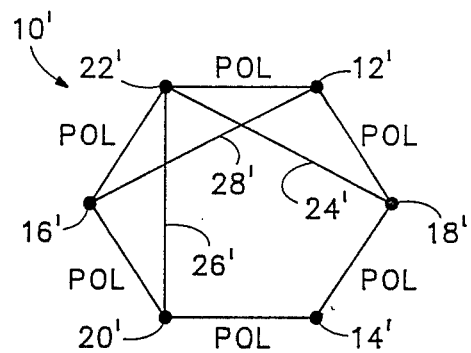
Figure 1C:
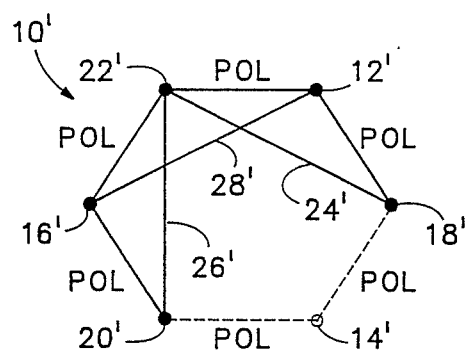
Figure 1D:
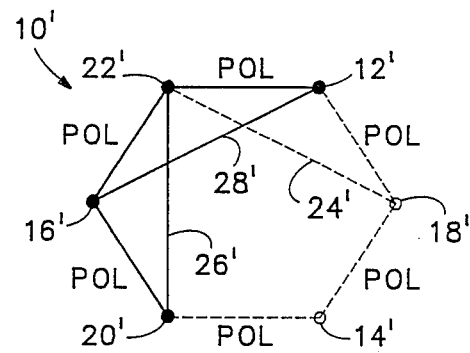
Figure 1E:
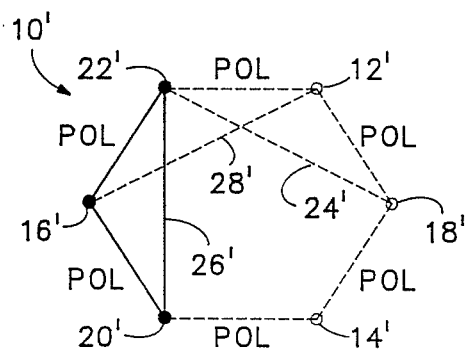
Figure 1F:
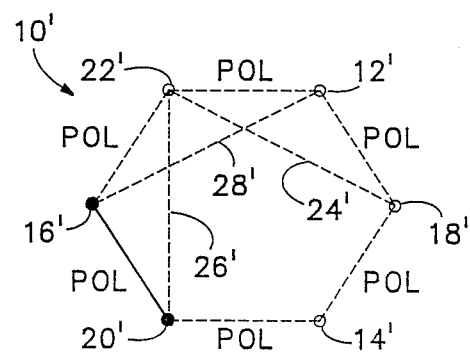

In accordance with the present invention, the user of a CAD system generates a drawing in two stages. First, the user specifies topologic aspects of the drawing to the computer in terms of geometric entities and their structural relationships. For example, to draw a triangle the user creates three lines and specifies that certain line end points are coincident. At this stage the drawing contains a set of structurally constrained geometric entities, i.e. three lines and three points with certain line end points being coincident to form a triangle. Topologic drawings are desirable because the user quickly sketches the basic drawing using a simple command set without regard for dimensioning details. In the second stage, the user imposes dimension constraints to uniquely define the drawing geometry. Returning to the triangle example, the user might require a triangle having at one corner an angle within a predetermined range of tolerance and an adjacent side length within a predetermined range of tolerance. Imposing these dimension constraints upon the drawing satisfies the required tolerances, but does not constrain the triangle to a unique geometry, i.e. an angle and an adjacent side length are insufficient to describe a unique triangle. The user must apply additional dimension constraints, but must not impose impossible constraints and should not impose redundant constraints. A method of dimension analysis according to the present invention monitors the application of dimension constraints and informs the user when dimension constraints are impossible or redundant.

In accordance with the preferred embodiment of the present invention, once the topologic aspects of the drawing are specified, the geometric entities and structure constraints being established, and as the user begins applying dimension constraints to the drawing, interactive analysis of the drawing by the computer determines whether the dimension constraints uniquely define its geometry without imposing redundant constraints. The interactive process informs the user as soon as a redundant dimension constraint is imposed and such constraints are avoided. The dimension constraints thereby established uniquely define the drawing yet are not interrelated, the value of each dimension constraint being variable without requiring a change in values of other dimension constraints. This is advantageous in the case of dimensions specified in terms of a range of tolerance and therefore subject to variation.

In the present discussion and in the appended claims, a drawing is "consistently dimensioned" if constrained by a stated set of dimension constraints wherein any one of the stated dimension constraints may be varied through a range of values without requiring a change in another dimension constraint. For example, a triangle limited by one angle and the length of an adjacent side is consistently dimensioned because each of these values, the corner angle and side length, may be varied through a range of values without a change in the other. In other words, in a consistently dimensioned drawing each stated dimension constraint is independent of other dimension constraints. In some cases the range of permissible values for a given dimension must be limited due to inherent structure constraints or rules of geometry. For example, a triangle cannot include a side having length greater than the sum of the two other sides. Thus, a triangle is consistently dimensioned when constrained by the lengths of all three sides, but the range of possible values for each side must be qualified. A drawing is "maximally consistent" when consistently dimensioned by a set of dimension constraints defining a finite number of geometrical configurations. A drawing is "overdimensioned" when redundant dimension constraints are imposed. A triangle constrained by an angle and the lengths of its adjacent sides is maximally consistent, but if further described in terms of the length of the third side is overdimensioned, the length of the third side being established by the first mentioned constraints.

The preferred embodiment of the present invention as illustrated herein uses points and lines as geometric entities to characterize a drawing; however this does not limit its application to drawings consisting solely of points and lines. Any geometric entity modeled in terms of points and lines may form a portion of a drawing subject to the preferred embodiment of the present invention as illustrated herein. Data structures modeling the drawing would define points and lines but the display presented to the user could include arcs, curves, and circles. For example, a center point and a radius value associated with the point define a circle. A center point and a pair of lines, each extending from the center point and of length equal to an arc radius, define an arc. Techniques are known for modeling curves as splines wherein a bounding polygon, consisting of lines and points, uniquely defines a curve. Most drawings are sufficiently presented as points, lines, circles, arcs, and splines.

Points and lines in the plane have two degrees of freedom, and thus need two simultaneous constraints to determine their position. A point may be determined by distance from another point plus lying on a particular line, or by lying on two non-parallel lines. A line may be determined by its passing through a particular point and being a certain angle with respect to another line, or by passing through two points. A geometric entity which has more than two constraints between itself and the portion of the object which has already been constructed is overdimensioned, and a geometric entity with less than two constraints is not completely specified because at least one degree of freedom remains.

According to the present invention, a drawing is analyzed by first identifying a geometric entity associated with a particular number of structural and dimension constraints, that number being a function of the number of degrees of freedom associated with the geometric entity, and removing the geometric entity an and its associated constraints from the drawing. For a two dimension drawing characterized in terms of points and lines, any point or line associated with two constraints is removed first and stored together with its associated constraints as an instruction for reattachment to the remainder of the drawing. The process continues by successively identifying and removing geometric entities associated with a given number of constraints and storing their reattachment instructions. If the drawing is maximally consistent, the process continues until only two geometric entities and a single associated constraint remain in the drawing. The drawing is then reconstructed by taking the remaining pair of geometric entities as a reference and utilizing the stored instructions in reverse order to reattach the removed geometric entities.

If the drawing is not maximally consistent then the process does not result in a pair of geometric entities and a single associated constraint. According to a second method of analysis, by successively identifying and removing geometric entities associated with fewer than a particular number of constraints it is possible to determine whether the drawing is consistently dimensioned or overdimensioned. For a two dimension drawing characterized in terms of points and lines, any point or line associated with two or less constraints is removed. If all geometric entities and constraints can be removed then the drawing is consistently dimensioned, otherwise it is overdimensioned.

In accordance with the preferred embodiment, a constraint graph models a drawing and represents structure and dimension constraints imposed upon geometric entities. Constraint graph vertices correspond to geometric entities, such as lines and points, and constraint graph edges correspond to structure and dimension constraints, such as point-on-line relationships, angles and lengths. After the topologic definition of the drawing is complete, the geometric entities and inherent structure constraints being identified, additional edges are added to the constraint graph as the user imposes dimension constraints. Each geometric entity must be eventually constrained by at least two dimension or structure constraints. For a maximally consistent drawing each vertex must be of at least degree two because at least two dimension or structure constraints must apply to each geometric entity. Vertices of degree one represent insufficiently specified geometric entities as only one constraint applies to the corresponding geometric entity. Vertices of degree greater than two represent geometric entities upon which other geometric entities depend in terms of dimension or structure constraints, or represent geometric entities which have been overdimensioned. As each edge is added to the graph, the graph is consulted to determine whether the drawing is overdimensioned, consistently dimensioned, or maximally consistent.

A constraint graph models a maximally consistent drawing when it can be reduced to a single edge connecting two remaining vertices by successive removal of vertices of degree two. Thus, a first constraint graph reduction test removes vertices of degree two and their connecting edges to determine maximal consistency. The drawing is reconstructed by storing the reduction steps and reversing the process whereby the geometric entities corresponding to the vertices remaining after reduction form a reference upon which the remainder of the drawing is constructed.

An additional screening test determines whether a graph models a maximally consistent drawing. In this screening test the edges are counted and compared to the number of vertices. It can be shown that if the number of edges does not equal $(2n)-3$, where n is the number of vertices, the graph will not reduce to a single edge connecting two vertices by removal of vertices of degree two, and therefore the first constraint graph reduction test may be avoided.

A second constraint graph reduction test detects whether the drawing modeled by the graph is consistently dimensioned or overdimensioned and operates by removal of vertices of degree two or less. According to this test, a drawing is consistently dimensioned when the graph reduces to no edges or vertices, i.e. a null graph. If graph reduction is blocked, that is if at some point no vertices of degree two or less exist, then it is known that geometric entities are redundantly constrained because more than two dimension constraints have been imposed.

Given these tests, it is possible to quickly determine whether a drawing modeled by a constraint graph is maximally consistent, consistently dimensioned, or overdimensioned. First, the screening test may be used to determine whether the graph has any possibility of reduction to a single edge connecting two vertices. If the screening test succeeds then the graph is reduced according to the first reduction test by removal of vertices of degree two. If the graph reduces to a single edge connecting two vertices, then it is known that the drawing is maximally consistent and that no additional dimension constraints may be imposed. If the graph does not reduce to a single edge connecting two vertices, then the drawing is either consistently dimensioned, in which case additional dimension constraints are needed, or it is overdimensioned, in which case dimension constraints must be removed. Application of the second graph reduction test determines whether the drawing is consistently dimensioned or overdimensioned, if the graph reduces to a null graph it is consistently dimensioned and possesses the potential to be maximally consistent, otherwise it is already overdimensioned and cannot be maximally consistent unless dimension constraints are removed.

In FIG. 1, consider triangle 10 sketched to include lines 12, 14 and 16 with end points of lines 12 and 14 coincident at a point 18, end points of lines 14 and 16 coincident at a point 20, and end points of lines 16 and 12 coincident at a point 22. These criteria represent topologic aspects embodied in a sketch of the drawing. Line is dimensioned as having a length 24 while line has a length 26. The included angle between lines 12 and 16 is set as angle 28. Triangle 10 is thereby uniquely specified by providing values for the lengths of two sides and the included angle. The values of each of these dimensions is variable within a range of permissible values without changing the values of other dimensions. Triangle 10 includes six geometric entities, lines 12, 14 and 16 and points 18, 20 and 22. Structure constraints imposed upon triangle 10 place point 18 on lines 12 and 14, point 20 on lines 14 and 16, and point 22 on lines 12 and 16. Dimension constraints imposed upon triangle 10 are that line 12 is of a given length 24, line 16 is of a given length 26, and the angular displacement between lines 12 and 16 is angle 28.

Constraint graph 10' models triangle 10 and includes vertices representing geometric entities and edges corresponding to dimension and structure constraints. Thus, graph 10' includes six vertices, three labeled 18', 20', and 22' for the points 18, 20, and 22, respectively, and three labeled 12', 14' and 16' for lines 12, 14, and 16. A first set of edges, each labeled POL, correspond to structure constraints imposed upon triangle 10 which reflect the coincidence of certain line end points to form a triangle. Thus, a POL edge connects vertex 22' and vertex 12' and represents a point-on-line relationship. A POL edge couples vertex 12' and vertex 18', indicating that point 18 lies on line 12. In similar fashion, POL edges extend from vertex 20' to vertex 16' and to vertex 14', and reflect point-on-line relationships between point 20 and lines 16 and 14. A POL edge extends from vertex 16' to vertex 22' and indicates that point 22 lies on line 16 while a POL edge between vertex 14' and vertex 18' indicates that point 18 lies on the line 14'. An additional set of edges of graph 10' correspond to dimension constraints imposed upon triangle 10. Edge 28' connects vertex 12' and vertex 16' and reflects the angular constraint between lines 16 and 12. Edge 24' between vertices 18' and 22' corresponds to the length constraint upon line 12. Edge 26' connects vertices 22' and 20' and reflects the fact that line 16 is constrained in length.

Graph 10' is reduced according to the first reduction test by successively removing vertices of degree two to determine whether triangle 10 is maximally consistent. The first vertex removed must be vertex 14', as it is the only vertex of degree two, and upon its removal the POL edges extending from vertex 14' to vertices 18' and 20' must also be removed. At this point either vertex 18' or vertex 20' may be removed as each is of degree two. Removal of vertex 18' leaves vertices 12', 16', 20', and 22' and the respective interconnecting edges. Vertex 12' is then removed leaving vertices 16', 20' and 22', each being of degree two and removable in the next step to leave graph 10' with two vertices and a single interconnecting edge. Removal of vertex 22' leaves vertices 16' and 20' and a single interconnecting POL edge. This verifies that the structure and dimension constraints imposed upon triangle 10 are maximally consistent.

Figure 2A:
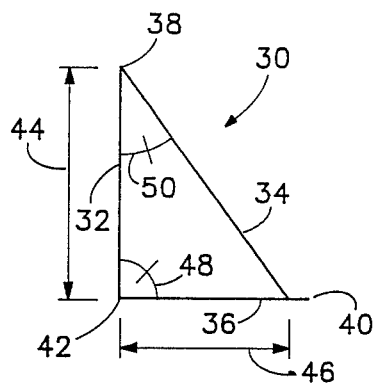
FIG. 2 shows an overdimensioned drawing and its corresponding constraint graph.
Figure 2B:
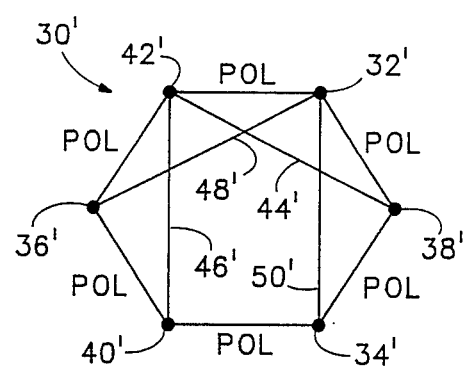
Figure 3A:
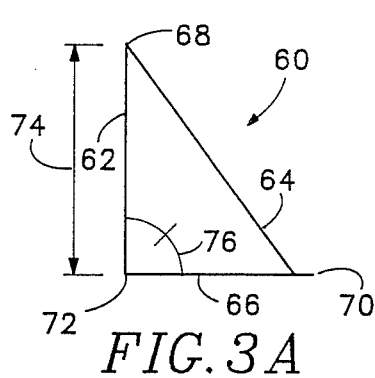
FIG. 3 illustrates a consistently dimensioned drawing and its corresponding constraint graph.
Figure 3B:
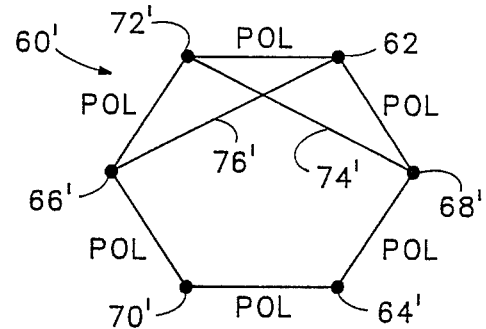
Figure 3C:
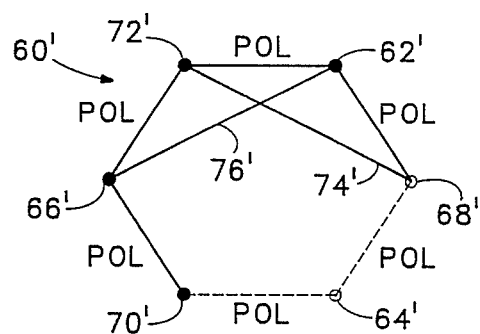
Figure 3D:
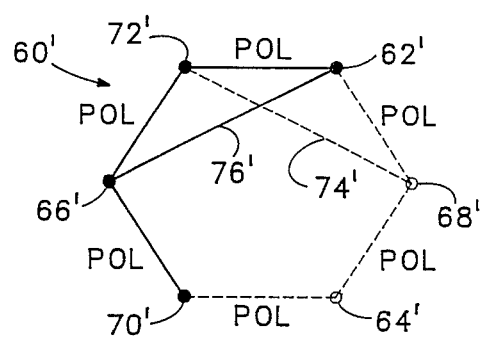
Figure 3E:
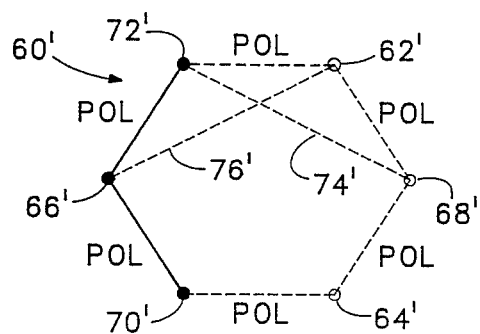

In FIG. 2, an overdimensioned triangle 30 is similar to triangle 10 (FIG. 1) in terms of structure and dimension constraints, but includes an additional dimension constraint restricting a second angle. As in the case of triangle 10 (FIG. 1) triangle 30 includes six geometric entities, three lines, 32, 34, and 36, and three points 38, 40, and 42. A constraint graph 30' modeling triangle 30 includes vertices 32', 34', 36', 38', 40', and 42' and a path of POL edges connecting these vertices with each POL edge representing a structure constraint corresponding to a point-on-line relationship. Lines 32 and 36 are restricted to lengths 44 and 46, respectively, and graph 30' includes corresponding edges 44' and 46' connecting vertex pairs 38',42' and 40', 42', respectively. The angular displacement between lines 32 and 36 is angle 48, represented in graph 30' as edge 48' coupling vertices 32' and 36', while the angular displacement between lines 32 and 34 is angle 50, corresponding to edge 50' between vertices 32' and 34'. It is seen that no vertex in graph 30' is of degree two or less. Accordingly, it is known that triangle 30 is not maximally consistent as graph 30' cannot be reduced to a single edge connecting two vertices by removing vertices of degree two. Furthermore, it is known that triangle 30 is overdimensioned because graph 30' cannot be reduced to a null graph by successive removal of vertices of degree two or less.

Overdimensioning is not inherently incorrect because dimension constraints can be stated in a compatible manner; however, overdimensioning creates an unnecessary interrelationship or interdependence among the dimension constraints where changing one dimension constraint requires a change in a second dimension constraint. If a drawing is maximally consistent or consistently dimensioned, interdependency among dimension constraints is eliminated.

In FIG. 3, a consistently dimensioned triangle 60 is similar to triangle 10 (FIG. 1) in terms of structure constraints, but includes one less dimension constraint. Triangle 60 is sketched to include six geometric entities, lines 62, 64, and 66, and points 68, 70, and 72 in a manner similar to triangle 10 (FIG. 1). As for dimension constraints, line 62 is limited to length 74 and the angular displacement between lines 62 and 66 is limited to angle 76. Graph 60' models triangle 60 and includes six vertices 62', 68', 64', 70', 66', and 72' serially coupled by POL edges corresponding to point-on-line relationships. FIG. 3 illustrates that application of the first graph reduction test, i.e. removal of vertices of degree two, fails when, for example, the following sequence of vertices are taken from the graph: 64', 68' and 62'. Subsequent to this removal sequence, vertex 66', though of degree two, cannot be removed to leave a pair of edges connected by a single edge as the remaining graph would contain unconnected vertices 70' and 72'. Triangle 60 is not maximally consistent as the first graph reduction test requires a single edge connecting two vertices. Although triangle 60 is not maximally consistent, it may posses the potential for being maximally consistent and the second graph reduction test detects this potential. If graph 60' can be reduced to a null graph by successive removal of vertices of degree two or less then the graph models a consistently dimensioned drawing which, if constrained by suitable additional dimension constraints, will be maximally consistent. By removing vertices of degree two, one, and zero, e.g. the vertex removal sequence of 64', 68', 62', 72', 66' and 70', graph 60' reduces to a null graph.

The order of vertices removed in either graph reduction test does not affect the outcome, and for each graph reduction test a single attempt to reduce a graph is sufficient because the order of reduction may be arbitrary. There is no need to test permutations of vertex removal sequences. Accordingly the time taken by the algorithm for testing constraint graphs by reduction varies linearly with the number of vertices, either the test succeeds on the first attempt or it does not, and may be applied with great efficiency on an interactive basis even for complex drawings modeled by constraint graphs with large numbers of vertices and edges.

Dimension analysis is conducted interactively as the user applies dimension constraints to a drawing and the user is constantly informed as to whether the drawing is underdimensioned, overdimensioned, or maximally consistent. In FIG. 4, consider polygon 90 sketched to include eight geometric entities, lines 92, 94, 96, and 98, and points 100, 102, 104, and 106. Constraint graph 90' represents existing geometric entities and structure constraints and includes vertices 92', 94', 96', 98', 100', 102', 104', 106' corresponding to the existing geometric entities, and edges labeled POL serially coupling these vertices and corresponding to structure constraints forming polygon 90. Graph 90' is tested for maximal consistency according to the first graph reduction test by removal of vertices of degree two and that test fails because a single edge connecting two vertices is not obtainable. Graph 90' is then tested according to the second graph reduction test by removal of vertices of degree two or less. Graph 90' reduces to a null graph indicating that polygon 90' is consistently dimensioned, and that no geometric entity is overdimensioned. Thus, additional dimension constraints are required for maximal consistency.

Figures 6A, 6B, 7A, 7B:
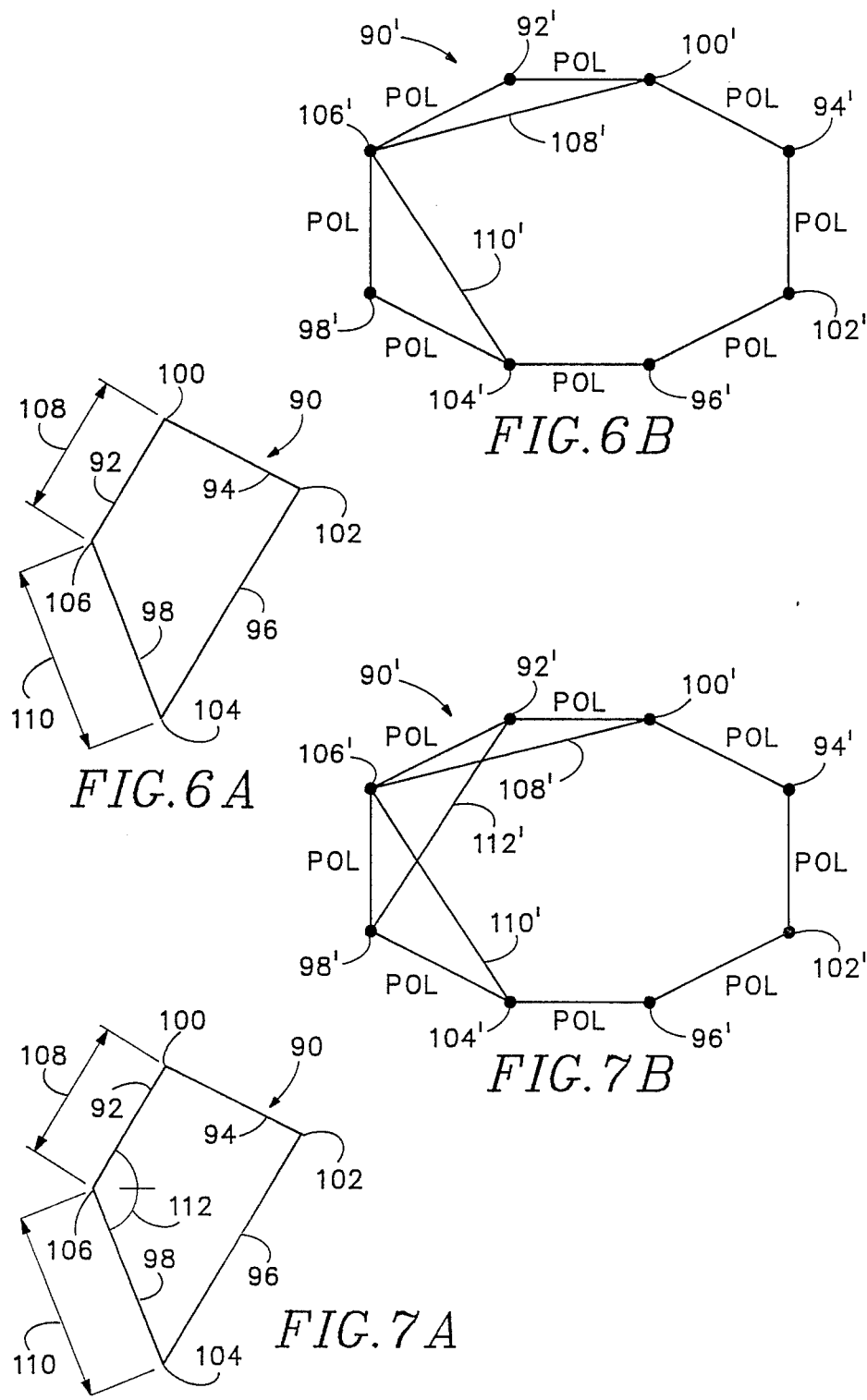
Figure 10B:
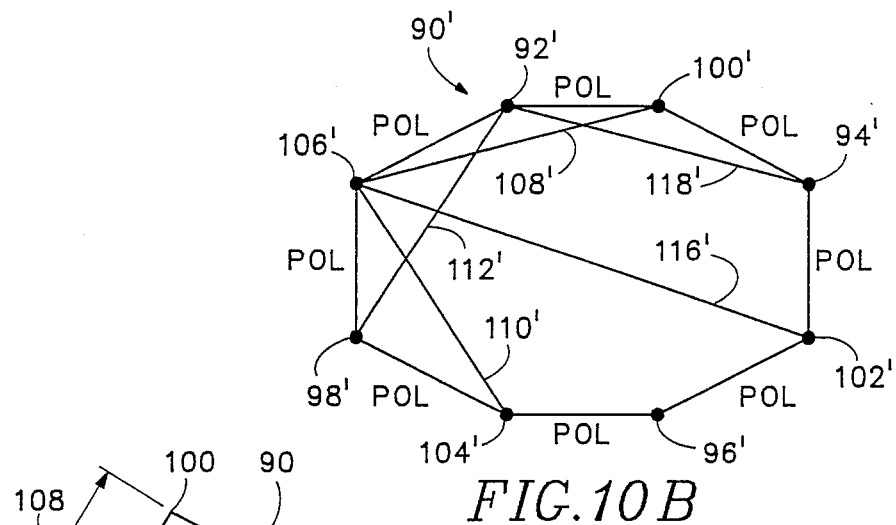
Figure 10A:
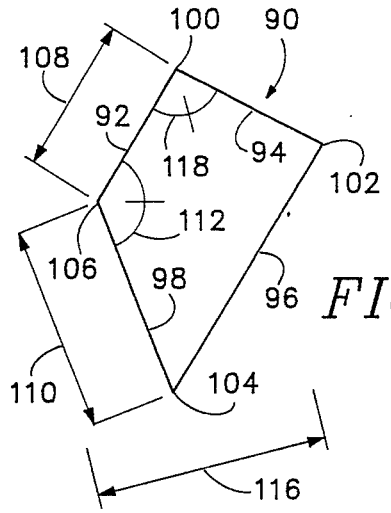

FIG. 5 shows polygon 90 and graph 90' after adding a first dimension constraint limiting line 92 to length 108. Edge 108' couples vertices 100' and 106' and represents this first dimension constraint. Polygon 90 is not maximally consistent because graph 90' does not reduce to a single edge connecting two vertices by removal of vertices of degree two, but it is consistently dimensioned because graph 90' reduces to a null graph by removal of vertices of degree two or less. Thus, the user is permitted to apply additional dimension constraints to polygon 90. FIG. 6 illustrates a second dimension constraint applied to polygon 90 and an additional edge in graph 90'. Line 98 is now limited to length 110 and edge 110' connects vertices 106' and 104' in graph 90'. Again, graph 90' fails the first graph reduction test but succeeds the second indicating that polygon 90 is not maximally consistent but is consistently dimensioned and possesses the potential for maximal consistency. In FIG. 7, a third dimension constraint applied to polygon 90 limits the angular displacement between lines 92 and 98 to angle 112 and a corresponding edge 112' connects vertices 106' and 104' in graph 90'. Application of the first and second graph reduction tests verifies that polygon 90 is still consistently dimensioned but not yet maximally consistent. In FIG. 8, a redundant dimension constraint limits the distance between points 100 and 104 to length 114, and edge 114' connects vertices 100' and 104' in graph 90'. Application of the second graph reduction test reveals that graph 90' cannot be reduced to a null graph by removal of vertices of degree two or less, implying that polygon 90 is now overdimensioned, and the user is informed immediately that a redundant constraint has been imposed and must be removed. In FIG. 9, the redundant constraint is removed a new constraint limiting the distance between points 102 and 106 to length 116 is imposed. Graph 90' cannot be reduced to a single edge connecting two vertices by removal of vertices of degree two, therefore polygon 90 is not yet maximally consistent. However, removal of vertices of degree two or less reduces graph 90' to a null graph indicating that polygon 90' is consistently dimensioned and requires additional constraints. In FIG. 10, a final dimension constraint applied to polygon 90 establishes maximal consistency, the angular displacement between lines 92 and 94 being angle 118. An edge connecting vertices 92' and 94' allows for reduction of graph 90' to a single edge connecting two vertices.

In the course of reducing graph 90' by removal of vertices of degree two, each vertex and edge pair removed constitutes a geometric operation for reconstructing polygon 90 as a scaled drawing. Suppose the following vertex removal sequence were used to reduce graph 90': 96', 104', 102', 94', 100', and 98'. Vertices 92' and 106' and a POL edge therebetween remain in graph 90' and provide a reference upon which the remainder of a scaled drawing may be constructed. Given values for each of the stated dimension constraints, a scaled drawing is constructed by reversing the graph reduction steps.

Figure 11:
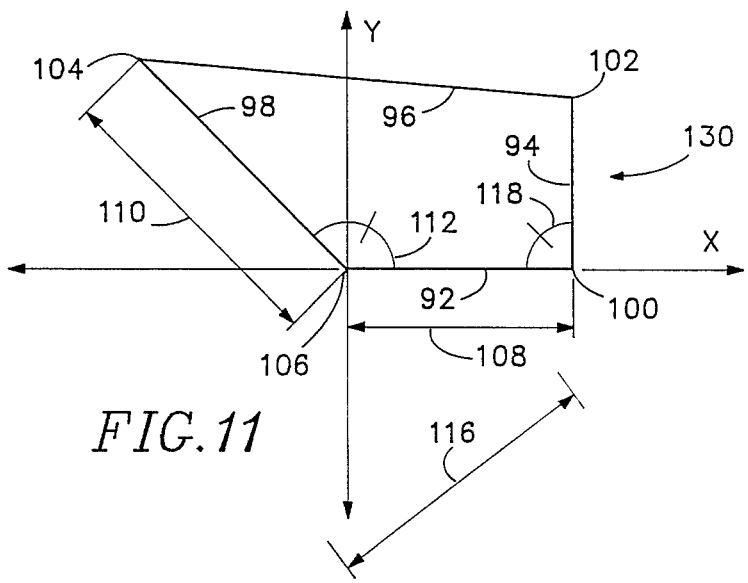
FIG. 11 illustrates a method of constructing a scaled drawing from a maximally consistent drawing.

In FIG. 11, to begin construction of scaled drawing 130 of polygon 90, line 92 is taken as being on the X axis with point 106 being coincident with the origin. The last elements removed from graph 90' were vertex 98', a POL edge connecting vertex 98' to vertex 106', and edge 112' connecting vertex 98' with vertex 92'. Thus, the first geometric entity added to the scaled drawing is line 98 and it is known that end point 106 of line 98 lies on line 92 and its angular displacement with respect to line 92 is angle 112. This is sufficient information to fully specify the position of line 98 relative to line 92. The next geometric entity added to scaled drawing 130 corresponds to the next to the last elements removed from graph 90′, viz. vertex 100′, edge 108′ extending from vertex 100′ to vertex 106′, and a POL edge connecting vertex 100′ and vertex 92′. Point 100 is thereby known to be a distance 108 from point 106 along line 92. The next geometric entity added to scaled drawing 130 corresponds to the removal of vertex 94′, a POL edge connecting vertex 94 and vertex 100′, and edge 118 connection vertex 94′ and vertex 92′. Line 94 is positioned relative to line 92 as it is known that the angle therebetween is angle 118 and that lines 92 and 94 intersect at point 100. The next geometric operation is derived from the step of removing vertex 102′, edge 116′ connecting vertex 102′ and vertex 106′, and a POL edge connecting vertex 102′ and vertex 94′. This information places point 102 on line 94 at a distance 116 from point 106. Continuing with the reversed graph reduction steps, point 104 is then positioned along line 98 at a distance 110 from point 106, and line 96 lies on points 102 and 104. The resulting scaled drawing may be rotated for display to appear similar to the sketched version.

It may be appreciated that any one of the stated dimension constraints could be modified and the scaled drawing regenerated using a new value for that constraint. It is not necessary to determine whether a change in one dimension constraint affects other dimension constraints because the drawing is maximally consistent.

Figure 12:
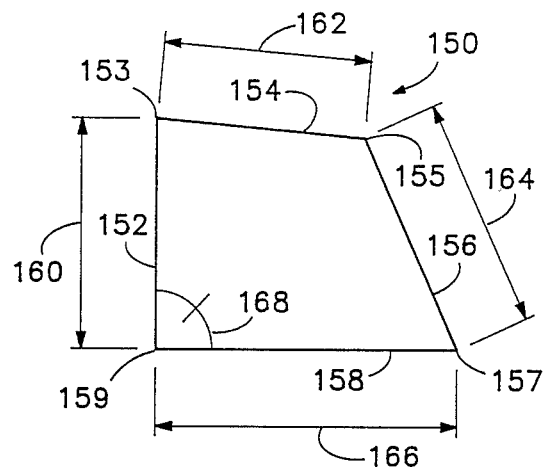
FIGS. 12-14 illustrate a method of selecting among possible geometric solutions by taking measurements from a sketch.
Figure 13:
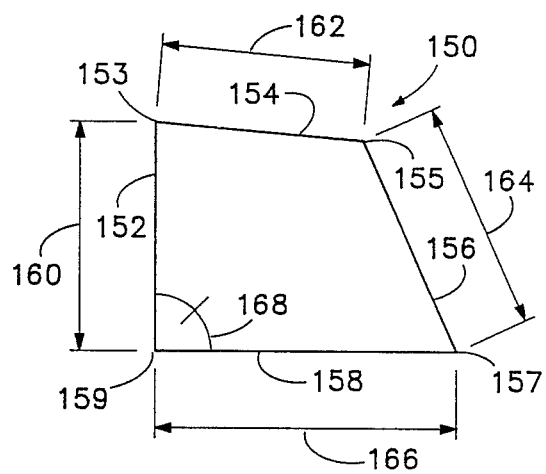
Figure 14:
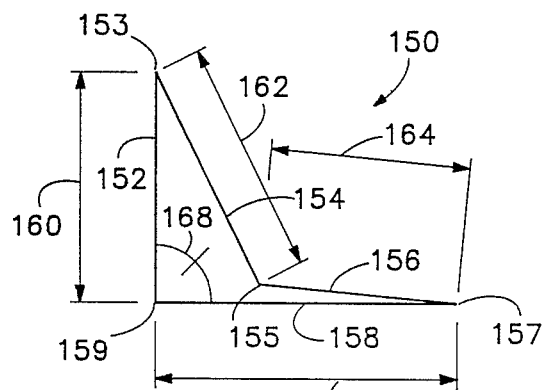

Some geometric operations admit more than one solution, but always a finite number of solutions. In such cases the desired solution is selected by examination of the topologic sketch. For each possible geometric operation there is a specific measurement which may be taken from the sketch to discriminate among possible solutions. Consider polygon 150 sketched in FIG. 12 where each of sides 152, 154, 156, and 158 are limited by lengths 160, 162, 164, and 166, respectively, and the angular displacement between sides 152 and 158 is angle 168. Point 153 forms the intersection of side 152 and 154, point 155 forms the intersection of sides 154 and 156, point 157 forms the intersection of sides 156 and 158, and point 159 forms the intersection of sides 158 and 152. Suppose that in constructing a scaled drawing of polygon 150, all geometric entities have been drawn with the exception of side 154, side 156 and point 155. Two possible locations for point 155 are shown in FIGS. 13 and 14, respectively. The measurement taken from the sketch of polygon 150 and used to select one of the two possible solutions is the angle between lines 154 and 156. If this angle is reflex then the solution shown in FIG. 14 is selected, otherwise the solution shown in FIG. 13 is selected.

Maximally consistent drawings are useful for kinematic animation and study of toleranced dimensions because dimension constraints may be varied and a scaled drawing quickly regenerated using new values for dimension constraints. Consider polygon 150 shown in FIG. 12, with each of sides 152, 154, 156 and 158 dimensioned in length and the single angular constraint 168 established between sides 152 and 158. Polygon 150 models a four bar linkage and is animated by holding side 158 in place and varying angle 168 through a range of values to drive side 152 into rotation about point 159. As for the study of toleranced dimensions, consider a part having several dimensions toleranced to be within a range of values. A maximally consistent drawing using these dimensions as stated dimensions permits the user to vary each dimension to study the structure of the part with various dimension values.

The linear nature of the constraint graph reduction tests permit a graphics system to auto-dimension a part. If the user specifies the topologic aspects of a drawing, and possibly applies several dimension constraints, a unique geometry is obtained automatically by iteratively applying dimension constraints and testing the resulting graph until maximal consistency is achieved. If the graph reduction tests were not linear such a process would be prohibitively time consuming.

Special rules may be required in light of a particular "tool set" used to render the drawing. For example, if a graphic system is unable to determine the location of a point given its distance from two other points, then the first graph reduction test would be modified to require that a vertex cannot be removed if both of the connecting edges stated a length dimension. In this regard it is helpful to label edges as POL, DISTANCE, and ANGLE to quickly determine when a vertex may be removed in light of special rules pertaining to a given tool set. Other special rules might pertain to rules of geometry. Consider a triangle with each corner having a stated angular constraint between its adjacent sides. This structure results in a constraint graph which according to the first graph reduction test reduces to a single edge connecting two vertices; but, is known not to define a unique triangle. Accordingly, vertices should not be removed from the constraint graph when both connecting edges are angular constraints. A special rule is needed if the user is allowed to state "parallel distance" as a dimension constraint upon a line because parallel distance is a single relationship that fixes both the angular and translational degrees of freedom of a line. This constraint appears in the constraint graph as a pair of edges connecting a pair of vertices. If parallel distance is not handled as a special case it is possible to have a constraint graph which reduces to a single edge connecting two vertices for one vertex removal sequence and not for another vertex removal sequence It may be shown that the following rule will avoid this situation: if a new vertex and a pair of edges are added to a constraint graph and two old vertices are adjacent to the new vertex then there must not be a chain of double edges joining the two old vertices. This prevents construction of a line or point using dimensions relating its position to that of two parallel lines.

Higher order dimensional images are subject to the present invention. For a three dimensional image where points and lines are used to characterize the drawing, each point and line has three degrees of freedom in three dimensional space and a constraint graph is constructed in a similar manner, with vertices corresponding to geometric entities and edges associating vertices with dimension or structure constraints therebetween. When testing for maximal consistency vertices of degree three are removed from the constraint graph and when testing for consistent dimensioning or overdimensioning vertices of degree three or less are removed from the constraint graph. If by removal of vertices of degree three the graph reduces to three vertices and three edges, in the shape of a triangle, then the constraint graph models a maximally consistent three dimensional drawing. If by removal of vertices of degree three or less the graph reduces to a null graph then the graph models a consistently dimensioned three dimensional drawing, otherwise the drawing is overdimensioned.

The method of the present invention provides more meaningful error messages in the case where the user specify impossible geometry. Such cases are detected during the course of constructing the drawing when a specific geometric operation is impossible, i.e. for a particular geometric entity, pair of constraints, and associated constraint values no solution exists. This information is easily interpreted by the user.

The method of the present invention overcomes a traditional problem with CAD packages complicated entry of geometric data requiring the user to state explicitly cartesian coordinates with a complex and difficult to learn command set, and provides a method of converting a dimensioned sketch into a scaled drawing with a simple easy to learn freehand sketch user interface. Minor changes in dimension constraints do not require extensive modification of the drawing as interdependency among dimension constraints can be eliminated.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A computer-aided method of dimension analysis of a geometric figure comprising the following steps:
   specifying to a computer a topologic definition of said geometric figure to establish a set of geometric entities interrelated by structure constraints, said structure constraints associating pairs of said geometric entities;
   specifying to the computer a dimension definition of said geometric figure to establish stated dimension constraints interrelating selected ones of said geometric entities, said dimension constraints associating pairs of said geometric entities;
   determining whether said topologic definition includes a geometric entity constrained by a predetermined number of associated constraints, and, if so,
   removing such geometric entity and said predetermined number of associated constraints from said topologic definition and said dimension definition.

2. The method according to claim 1, wherein said geometric figure is a two dimensional geometric figure, said predetermined number of associated constraints is two associated constraints, and subsequent to removal of a geometric entity and its associated constraints from said topologic definition and said dimension definition the method comprises the further steps:
   repeatedly determining whether said topologic definition and said dimension definition include a geometric entity constrained by two associated constraints and removing such geometric entity and associated constraints from said topologic definition and said dimension definition until there are no further geometric entities constrained by two associated constraints; and
   determining whether the remaining topologic definition and dimension definition consists of two geometric entities interrelated by a single constraint.

3. The method according to claim 1, wherein said topologic definition and said dimension definition are embodied in a data structure having entities corresponding to geometric entities and components of said entities corresponding to structure and dimension constraints.

4. A computer-aided method of dimension analysis of a geometric figure comprising the following steps:
   (a) specifying to a computer a topologic definition of said geometric figure to establish a set of geometric entities interrelated by structure constraints;
   (b) specifying to a computer a dimension definition of said geometric figure to establish stated dimension constraints applied to and interrelating selected ones of said geometric entities; and
   (c) employing the computer to:
      (i) model said geometric figure as a graph wherein each vertex corresponds to one of said geometric entities and each edge correspond to a structure constraint or a dimension constraint;
      (ii) determine whether said said graph includes a vertex of a given degree, and, if so,
      (iii) modify said graph by removing said vertex of a given degree and edges connected thereto.

5. The method according to claim 4, wherein said geometric figure is a two dimensional geometric figure, said given degree is degree two, and step (c) of the method further comprises:
   (iv) repeating steps (c) (ii) and (c) (iii) until no further vertices of degree two remain in the graph.

6. The method according to claim 5, wherein said geometric figure is a two dimensional geometric figure and the method further comprises the steps of:
   (d) employing the computer to classify said geometric figure as maximally consistent if the result of step (c) (iv) is a single edge connecting two vertices, and otherwise;
   (e)
      (i) determining whether the modified graph includes a vertex of degree less than two, and, if so,
      (iii) modifying the graph by removing the vertex of degree less than two from the graph, and
   (f) employing the computer to classify said geometric figure as consistently dimensioned if the modified graph is a null graph and otherwise classify said geometric figure as overdimensioned.

7. The method according to claim 6, wherein step (e) further comprises:
   (v) determining whether the modified graph includes a vertex of degree two or less, and if so, modifying the graph by removing the vertex of degree two or less from the graph, and
   (vi) repeating step (e) (v) until no further vertices of degree two or less remain.

8. A computer-aided method of generating a scale drawing of a geometric figure comprising the steps:
   specifying to a computer a set of geometric entities and structure constraints therebetween to form a topologic definition of said geometric figure, said structure constraints associating pairs of said geometric entities;
   specifying to the computer dimension constraints on said geometric entities to form a dimension definition of said geometric figure, said dimension constraints associating pairs of said geometric entities;

employ the computer to modify said topologic definition and said dimension definition by removing geometric entities associated with a given number of constraints and their associated constraints from said topologic definition and said dimension definition until said topologic definition and said dimension definition contain no geometric entities associated with said given number of constraints, said topologic definition then comprising a reduced topologic definition and said dimension definition then comprising a reduced dimension definition;

maintaining in the computer a sequence of geometric operations by storing each geometric entity and its associated constraints when removed from said topologic definition and said dimension definition as a geometric operation wherein the position of each removed geometric entity is specified relative to the remaining topologic definition and dimension definition by means of its associated constraints;

employing the computer to draw on an imaging device a first portion of said scale drawing based upon said reduced topologic definition and said reduced dimension definition; and employing the computer to draw on said imaging device the remaining portion of said scale drawing by taking said first portion as a reference and utilizing said sequence of geometric operations to construct additional geometric entities relative thereto.

* * * * *